(12) United States Patent
Pickens

(10) Patent No.: US 8,915,214 B2
(45) Date of Patent: Dec. 23, 2014

(54) POULTRY FEEDER WITH LEVEL SENSOR

(75) Inventor: Nathan Pickens, Decatur, IL (US)

(73) Assignee: The GSI Group, LLC, Assumption, IL (US)

( * ) Notice: Subject to any disclaimer, the term of this patent is extended or adjusted under 35 U.S.C. 154(b) by 0 days.

(21) Appl. No.: 13/569,699

(22) Filed: Aug. 8, 2012

(65) Prior Publication Data

US 2013/0036976 A1    Feb. 14, 2013

Related U.S. Application Data

(60) Provisional application No. 61/521,639, filed on Aug. 9, 2011.

(51) Int. Cl.
*A01K 39/012* (2006.01)
*G01G 15/00* (2006.01)
*G01G 13/24* (2006.01)

(52) U.S. Cl.
CPC ............ *A01K 39/0125* (2013.01); *G01G 15/00* (2013.01); *G01G 13/24* (2013.01)
USPC ........................................... 119/53; 119/57.4

(58) Field of Classification Search
CPC . A01K 39/012; A01K 5/0225; A01K 5/0114; A01K 5/02; A01K 39/01; A01K 5/0275; A01K 39/0125
USPC .................. 119/51.01, 57.4, 57.1, 57.2, 57.3, 119/51.02, 57.92, 52.1, 53; 137/551, 553, 137/554
See application file for complete search history.

(56) References Cited

U.S. PATENT DOCUMENTS

| | | | |
|---|---|---|---|
| 3,869,006 | A | 3/1975 | Hostetler |
| 3,904,082 | A | 9/1975 | Hostetler |
| 4,890,577 | A | 1/1990 | Maibach |
| 5,549,075 | A | 8/1996 | Golden |
| 5,724,912 | A | 3/1998 | Cull |
| 5,749,316 | A | 5/1998 | Deagan |
| 6,363,652 | B1 | 4/2002 | Spinelli |
| 6,779,486 | B2 | 8/2004 | Vaags |
| 7,124,707 | B1 | 10/2006 | Clarke |
| 7,513,216 | B2 | 4/2009 | Neckel |
| 2003/0070622 | A1 | 4/2003 | Vaags |
| 2006/0185604 | A1 | 8/2006 | Neckel |
| 2007/0044723 | A1 | 3/2007 | Anderbery |
| 2007/0051317 | A1 | 3/2007 | Bruner |

(Continued)

OTHER PUBLICATIONS

International Search Report from corresponding International Application No. PCT/US2012/049921, mailed Feb. 13, 2013.

(Continued)

*Primary Examiner* — Trinh Nguyen
(74) *Attorney, Agent, or Firm* — Polster, Lieder Woodruff & Lucchesi, L.C.

(57) ABSTRACT

A feed level sensor for a poultry feeding system is positioned within the drop tube of a control feeder of the feeding system. The sensor comprise a first light emitter/light detector pair to detect when the level of feed in the drop tube falls below a predetermined "empty" level and a second light emitter/light detector pair to detect when feed in the drop tube is at a predetermined "full" level in the drop tube. The sensor emits a "start" signal to activate a drive to deliver feed to the feeders along a feed line when it is detected that feed in the control feeder drop tube falls below the "empty" level and emits a "stop" signal to deactivate the drive when it detects that feed within the drop tube is at the "full" level.

11 Claims, 4 Drawing Sheets

(56) References Cited

U.S. PATENT DOCUMENTS

| | | |
|---|---|---|
| 2007/0144446 A1 | 6/2007 | Neckel |
| 2008/0251024 A1 | 10/2008 | Bos et al. |
| 2009/0056640 A1 | 3/2009 | Gross |
| 2010/0200089 A1 | 8/2010 | Fleshner |
| 2011/0126770 A1 | 6/2011 | Mulder et al. |
| 2011/0146580 A1 | 6/2011 | Jalbert et al. |

OTHER PUBLICATIONS

Written Opinion from corresponding International Application No. PCT/US2012/049921, mailed Feb. 13, 2013.

HALO—Feed System Control—Infrared Sensing Technology—"Installation and Operating Instructions"—Model #: HALOJRMAX—Printed Dec. 2007—8 pages (including cover page).

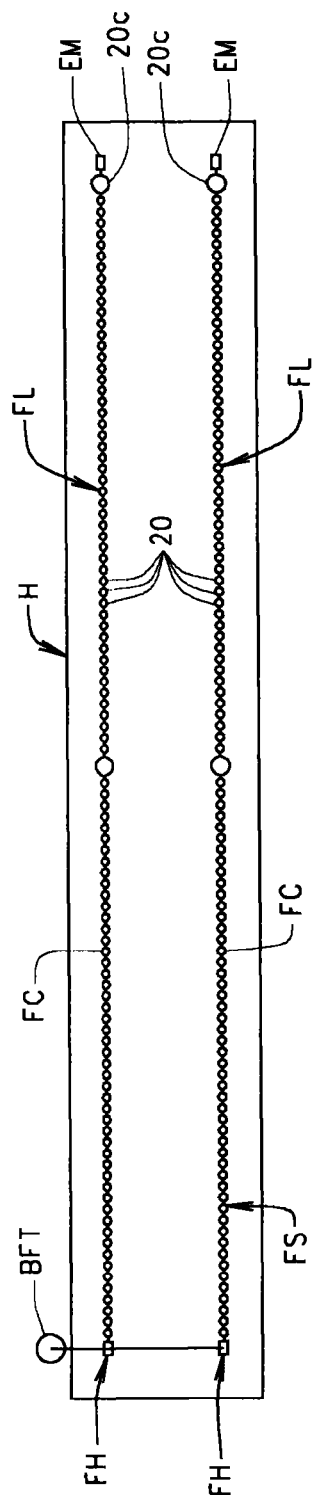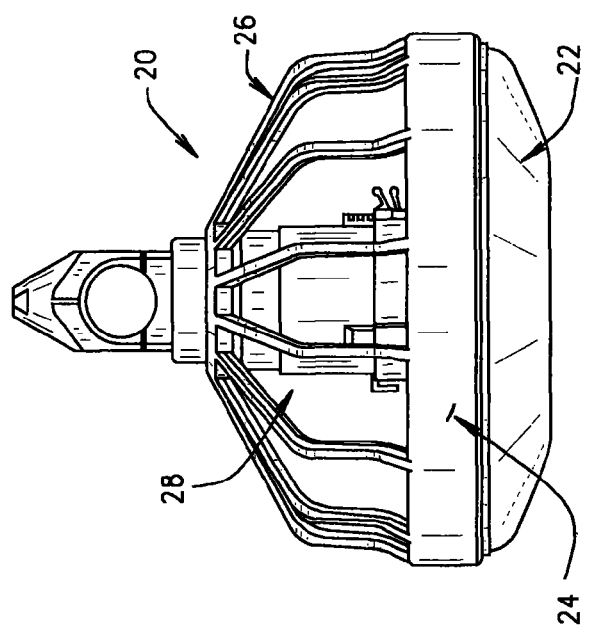

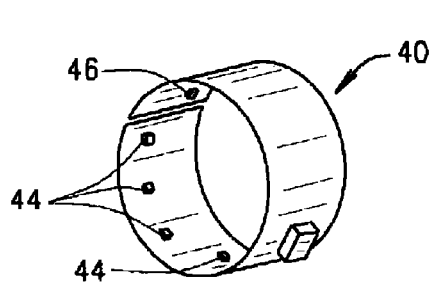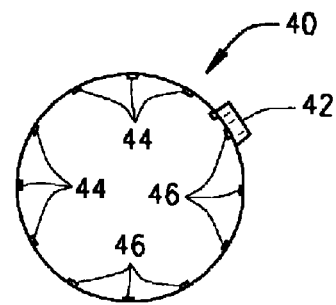
FIG. 9A   FIG. 9B
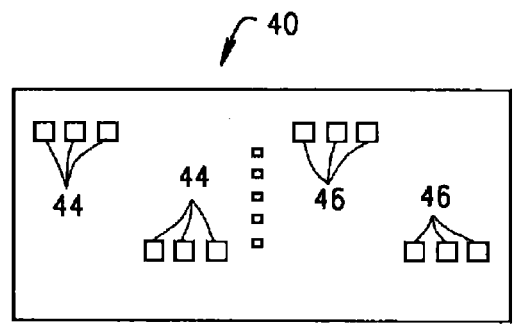
FIG. 9C
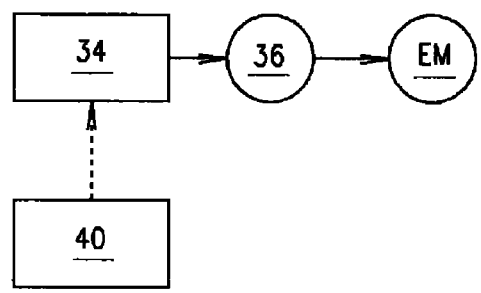
FIG. 10

POULTRY FEEDER WITH LEVEL SENSOR

CROSS-REFERENCE TO RELATED APPLICATIONS

This application claims priority to U.S. App. No. 61/521,639 filed Aug. 9, 2011. In addition, this application is related to co-owned U.S. application Ser. No. 12/699,572 which was published as Pub. No. US 2010/0200089 and which claims priority to U.S. App. No. 61/150,454, filed on Feb. 6, 2009. All of said applications are incorporated herein by reference.

STATEMENT REGARDING FEDERALLY SPONSORED RESEARCH OR DEVELOPMENT

Not Applicable.

BACKGROUND

A poultry feed system includes of a series of poultry feeders distributed along a horizontal feed tube. Feed is moved through the feed tube typically by means of an auger. The individual feeders are suspended from the feed line by means of a drop tube which is in communication with the feed tube by means of an opening in the feed tube. As feed passes over the opening, the feed will drop through the tube to fill the feeder pan and associated drop tube with feed. As can be appreciated, the feeders are generally filled sequentially, with the feeders at the beginning of the feed line being filled first. A control pan is placed at the end of the feed line. The level of feed in this control pan is monitored to activate and deactivate the supply of feed to the feeders. Being at the end of the line, the control pan will be the last to receive any feed, so all feeders along the line are filled before the control pan fills up. When the control pan is filled, the feed delivery system is deactivated. The feed system will again be activated to fill the feeders when it is determined that the control feeder has been depleted of a determined amount of feed.

Typical means of detecting the level of feed in a control pan include mechanical switches, proximity switches, paddles, rotating devices, etc., each with their own limitations.

BRIEF SUMMARY

Briefly, a control feeder for use in a feed system (such as in a poultry house) is disclosed. The control feeder includes a feed pan adapted to hold a determined amount of feed and a drop tube which opens into the feed pan. The drop tube is adapted and configured to be placed in communication with a feed delivery tube of the feed system. The control feeder further includes a feed level sensor adapted to detect the level of feed within the drop tube. The feed level sensor comprises at least one light emitter and at least one light receiver, at least one of which is positioned within the drop tube. The at least one light receiver is positioned to receive light from the at least one light emitter, such that the feed level sensor emits a "start" signal when feed within the drop tube is detected to be at or below be a predetermined "empty" level and a "stop" signal when feed in the drop tube is detected to be at or above a predetermined "full" level.

In accordance with one aspect of the sensor, the at least one light emitter and light receiver are both positioned in the drop tube, and the at least one light emitter being positioned in the drop tube to direct light across a width of the drop tube.

In accordance with an aspect of the sensor, the at least one receiver and at least one emitter define a single row. In this instance, the "empty" level and "full" level are at the same height relative to the drop tube.

In accordance with another aspect of the sensor, the at least one receiver and the at least one emitter comprise two or more receivers and emitters, wherein the receivers and emitters defining at least two rows of receiver/emitter pairs. In this instance, the "empty" level is below the "full" level, and the at least one sensor and at least one emitter comprise at least a first emitter/receiver pair positioned at the "empty" level in said drop tube and a second emitter/receiver pair positioned at the "full" level in said drop tube.

In accordance with an aspect of the sensor, the feed level sensor comprises a circuit board which is mounted within the drop tube, said circuit board including the at least one receiver and the at least one emitter. The circuit board can be flexible.

In accordance with an aspect of the sensor, the at least one light emitter is positioned and adapted to transmit light through a length of the drop tube. In this instance, the at least one light emitter can be positioned at or above a top of the drop tube and the at least one receiver can be positioned in the drop tube at a level below the emitter. The positions can be reversed, such that the at least one light emitter is at a level below the light receiver.

In accordance with an aspect of the sensor, the control feeder can include a control box, and the light emitter can be positioned in the control box. The control feeder can further include a light guide to direct light from the emitter into the drop tube, such that the light from the emitter is transmitted along a length of the drop tube to be detected by the receiver. In this instance, the at least one receiver comprises at least one receiver positioned at an "empty" level in the drop tube and at least one receiver positioned at a "full" level in the drop tube. The receivers at the full and empty levels all being arranged to detect light transmitted by said emitters.

In another aspect, a feed level control for a control feeder of a feed system is provided. The feed level control comprises a light receiver and a light emitter; the light receiver being adapted to direct light across a width of the drop tube or along a length of the drop tube, and the light receiver being positioned relative to the light emitter to detect light transmitted by the light emitter, whereby, when the light receiver receives light from the light emitter, the control emits a "start" signal and when said light receiver ceases to receive light from said light emitter, the control emits a "stop" signal.

In an aspect of the control, the light receiver and light emitter are positioned on a circuit board adapted to be received in a drop tube.

In an aspect of the control, the light receiver and light emitter each comprise a plurality of light receivers and emitters. The plurality of light emitters and the plurality of light receivers can define two or more rows of light emitters and light receivers, each said row comprising at least one light emitter and at least one light receiver. In this instance, one of the rows defines an "empty" level and another of the rows defines a "full" level, the "empty" and "full" levels being axially spaced from each other along a drop tube.

In one aspect of the control, the emitter is positioned to transmit light along a length of said drop tube, and one of the emitter and receiver is positioned above the other of the emitter and receiver. In this instance, the emitter can be positioned in a control housing; and the feed control can include a light guide to direct light to transmit light along a length of the drop tube. The light receiver is positioned in the drop tube, and in accordance with an aspect of the light receiver, can comprise a plurality of light receivers which define at least two levels of light receivers: a lower level of light receivers defining said "empty" level and an upper level of light receivers defining a "full" level.

In a further aspect, a method for controlling a feed system (such as in a poultry house) is disclosed. The feed system comprises a feed line, a feed hopper located at one end of the feed line, a conveying device which moves feed through the feed line, a drive for the conveying device and a control feeder in communication with the feed line to receive feed from the feed line through a drop tube. The control feeder comprises a feed level sensor in the drop tube. The method comprises activating the drive when the sensor determines that feed in the drop tube falls below an "empty" level in the drop tube; and deactivating the drive when the sensor determines that feed in the drop tube has reached a "full" level in the drop tube. In accordance with the method, the "full" level is above said "empty" level.

In accordance with an aspect of the method, the sensor comprises at least one light emitter and at least one light receiver. The sensor emits a "start" signal to activate the drive when the light receiver receives light from the light emitter; and the sensor emits a "stop" to deactivate the drive when the light receiver ceases to receive light from the light emitter.

BRIEF DESCRIPTION OF THE SEVERAL VIEWS OF THE DRAWINGS

FIG. 1 is a schematic drawing of a feeding system for a poultry house;

FIG. 2 is a side elevational view of a feeder used in the feeding system;

FIG. 3 is a cross-sectional view of the feeder showing feed filling the drop tube of the feeder;

FIGS. 9A-C are schematic views of the level sensor; and

FIG. 10 is a schematic of the control system for the motor of the feed system.

Corresponding reference numerals will be used throughout the several figures of the drawings.

DETAILED DESCRIPTION

Figure 4:
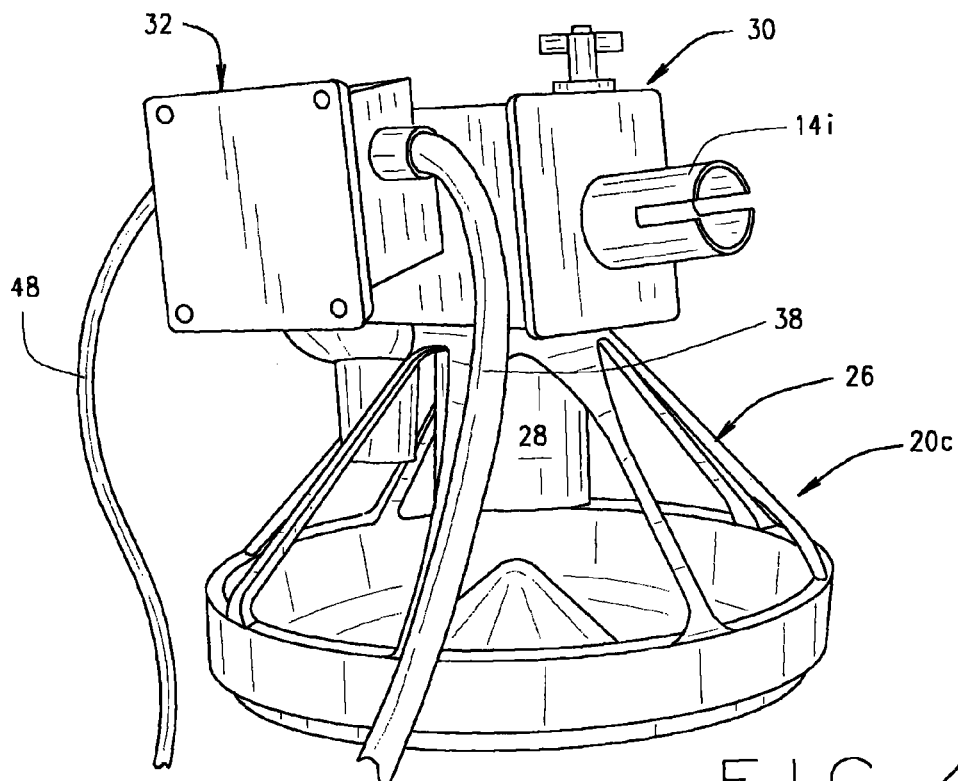
FIG. 4 is a perspective view of a control pan feeder with a level sensor incorporated therein.

The following detailed description illustrates the invention by way of example and not by way of claimed limitation. This description will clearly enable one skilled in the art to make and use the claimed invention, and describes several embodiments, adaptations, variations, alternatives and uses of the claimed invention, including what I presently believe is the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

Referring now to the drawings and particularly to FIG. 1, a poultry house is indicated in its entirety at H. Typically, such poultry houses are long structures having a length of several hundred feet and a width of about 40-60 feet. For example, a typical poultry house H may have a length of about 300 feet and house about 15,000-20,000 birds. Typically, these poultry houses are equipped with an automated feeding system having one, two, or more feed lines FL which typically run lengthwise of the house. Each of these feed lines has a feed hopper FH which receives poultry feed from a bulk feed tank BFT located outside of the poultry house. Each of the feed hoppers FH is connected to a feed conveyor FC comprising a feed conveyor tube 14 through which an auger conveyor extends. The auger may be rotatably driven by an electric motor EM within its respective conveyor tube. Alternatively, the auger may be a so-called centerless or flexible auger, such as shown in the prior art U.S. Pat. No. 5,875,882, or other such conveying means. If such flexible augers are used, it will be understood that the feed conveyor FC may be an endless loop within the poultry house with each elongate side of the loop constituting one of the feed lines FL. It will be understood that other types of feed conveying mechanisms, other than an auger can be used to deliver feed through the feed conveyor tube 14.

Each of the feed lines has a multiplicity of feeding stations FS spaced therealong at substantially equal intervals (e.g., about 2.5 foot intervals). For example, in a feed line having a length of about 280 feet, there may be about 112 feed stations FS. Generally, growers prefer to have about one feeding station FS for every 60-65 grown broilers. Each of the feeding stations FS is herein shown to include a feeder.

The feeding stations include a plurality of feeders 20 which are spaced along the feed line FL and a control feeder or control pan 20C positioned at an end of the feed line FL. The feeders include a pan 22 having a side wall 24 and a grill 26 which extends upwardly from the side wall. A drop tube 28 extends from the feed conveyor tube 14, through a ring in the grill 26 to deliver feed to the pan 22. Although the feeders are shown to include a grill, the grill is not necessary. In fact, the feeder disclosed in U.S. Pat. No. D625886 (which is incorporated herein by reference) does not include a grill. A skirt 29 can be provided around the bottom of the drop tube, and the height of the skirt relative to the drop tube can be adjusted to adjust the level to which feed fills the pan. As feed is delivered through the conveyor tube 14, as noted above, the feed drops through the drop tube 28 of the specific feeder 20, 20C under gravity. Once the feeder pan is filled to its predetermined level with feed, feed will continue to fill the drop tube, so that the drop tube 28 will be filled with feed, as seen in FIG. 3. As the birds in the poultry house consume the feed in the feed pan, the feed level in the pan will be maintained by the feed in the drop tube, and the level of feed in the drop tube will lower. However, at some point, there will be insufficient feed in the drop tube to maintain the level of feed in the pan.

As noted above, a control pan 20C is placed at the end of the feed line FL, and the level of feed in the control pan is monitored by a control system to activate and deactivate the motor EM to control delivery of feed to the feeders through the feed conveying tube 14. Hence, the motor for the auger (or other conveying mechanism) will not be activated until the control system determines that the feed in the control pan 20C has fallen below a predetermined level.

Figure 5:
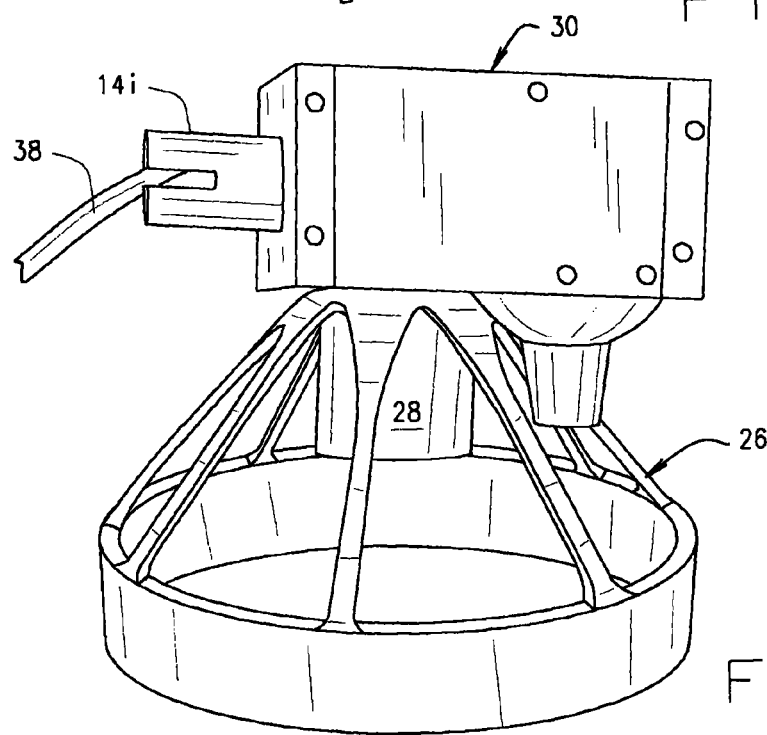
FIG. 5 is a perspective view of the grill of the control pan feeder with the level sensor incorporated therein, the view of FIG. 5 being rotated approximately 180° relative to the view of FIG. 4.

With reference to FIGS. 4 and 5, the control pan 20C includes a head box 30 having in inlet 14i which, in a feed system, is connected to the feed conveying tube 14. As seen in the illustrative embodiment, the head box 30 is positioned above the grill 26 of the feeder 10. As noted above, the feeder could be formed without the grill, in which case, the head box would be at the upper end of the drop tube. As is known, the inlet tube 14i is in communication with the drop tube 28 of the feeder 20C, so that feed delivered into the head box will be delivered to the control pan.

The motor EM is contained within (or adjacent) the head box 30 to drive the feed conveying mechanism (i.e., an augur) (not shown) which moves the feed through the conveyor tube 14. The head box 30 is constructed to isolate the motor EM from the feed delivered to the control pan through the head box 30. A control housing 32 (FIG. 4) houses a controller 34 (FIG. 10) having a relay 36. The relay 36 is in electrical communication with the motor EM, and is controlled by the controller 34 to activate and deactivate the motor EM. A power cord 38 extends from the control housing 32 to a source of power. The power cord 38 places the controller 34 and the motor EM in electrical communication with a source of electricity to provide electrical power to the controller and motor.

Figure 6:
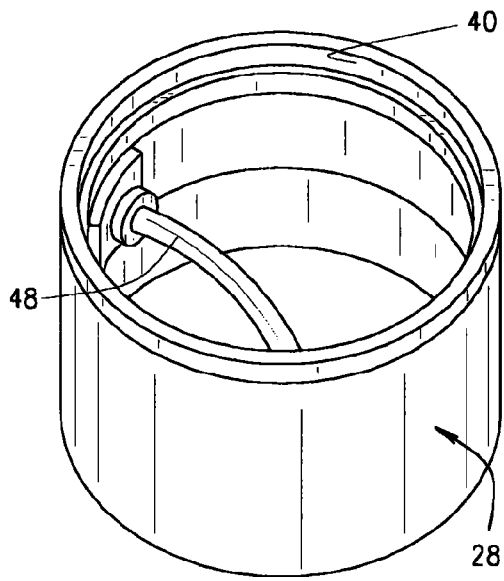
FIG. 6 is a bottom perspective view of a drop tube of the control pan feeder with a feed level sensor positioned therein.
Figure 7:
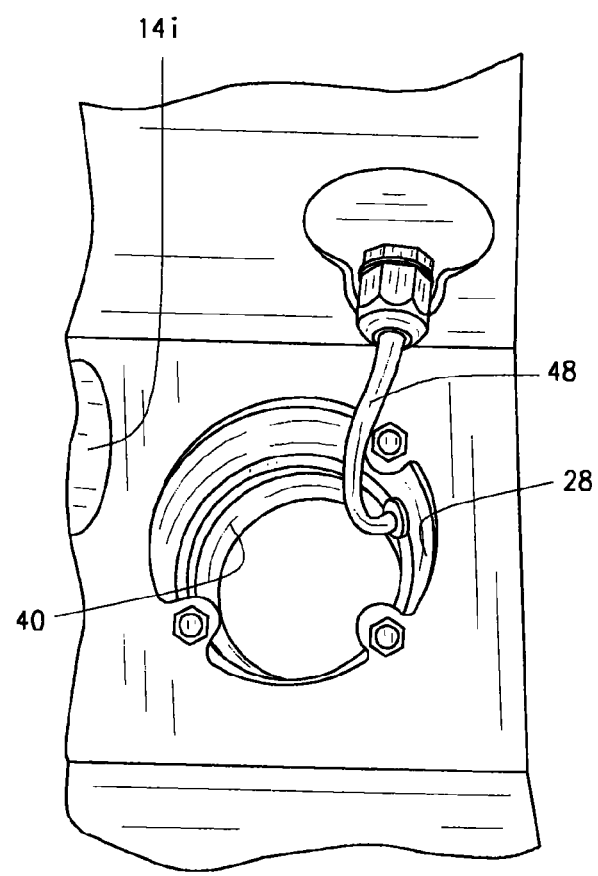
FIG. 7 is an enlarged top perspective view of the control pan feeder looking into a drop tube through a head box of the control pan feeder showing the placement of the level sensor in the drop tube.
Figure 8:
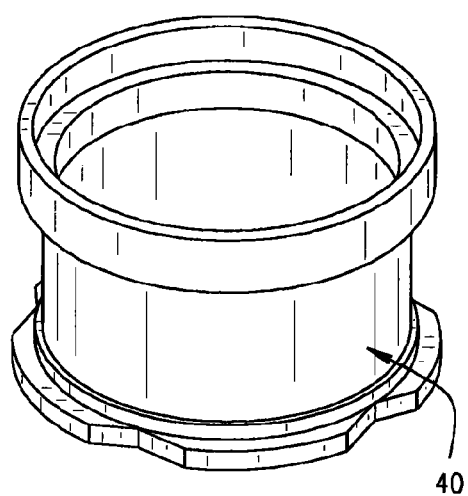
FIG. 8 is a perspective view of the level sensor.

An illustrative embodiment of a feed level sensor 40 is shown in FIGS. 6 and 7. As shown therein the feed level sensor 40 is mounted in the drop tube slightly below the top of the drop tube (i.e., slightly below the bottom of the head box 30). The sensor 40 is in electrical communication with the controller 34 by means of a control cable 48. With reference to FIGS. 9A-C, the feed level sensor comprises a cylindrical transparent circuit board which is sized to be received in the interior of the drop tube 28, such that a back surface of the circuit board is adjacent the inner wall of the drop tube. The sensor 40 includes a plurality of light emitters 44 and light receivers 46. The emitters 44 transmit infrared light, and the receivers detect infrared light. However, if desired, emitters and receivers which operate with light in other wavelengths could be used. The circuit board can also include microprocessor or controller 42 which would convey signals from the emitters and receives to the controller 34. However, the microprocessor/controller 42 which is shown to be on the circuit board could be incorporated into the controller 34 which is remote from the sensor 40. The infrared emitters and receivers are electrically connected to the controller 42, for example, by printed circuits in the flexible circuit board 40.

The circuit board 40 can be a flexible circuit board, which can then be provided in a flat, or unrolled, condition, as shown in FIG. 9C. The flat circuit board can then be rolled or curled into a cylinder to be received in the drop tube 28 of the feeder 20C. Alternatively, the sensor can be formed as a cylinder which is sized to be received in the drop tube of the feeder.

The receivers 46 and the emitters 44 are shown to be formed in groups of three. The use of multiple receives and transmitters will reduce the possibility of receiving a false signal from the sensor 40. Although shown as being formed in groups or sets of threes, the emitters and receivers can be formed in groups or sets of two or four or more. Alternatively, the emitters and receivers can be formed in single pairs (i.e., one sensor and one receiver).

The receivers and the emitters are positioned on the circuit board, and the circuit board is sized, such that when the board is positioned in the drop tube 28, the receivers 46 will be able to detect the light generated by the emitters. In FIG. 9B, the emitters are and receivers are show to be opposite each other (i.e., spaced apart by about 180°). However, such spacing is not necessary. Some emitters can produce a fairly wide beam (i.e., a cone of light), which will be detected by a receiver. Thus a receiver need not be directly opposite the emitter to detect the light from the emitter. The receiver could, for example, be spaced 120° from the emitter.

The sensor includes two groups or two pair of receivers 46 and two groups of emitters 44, the two groups being offset from each other. This provides for two sets of emitters/receivers which emit infrared light at approximately right angles to each other and axially off set from each other. With one set of emitters/receives being axially offset from the other set of emitters/receivers, the two sets of emitters/receivers define an upper set of emitters/receivers and a lower set of emitters/receivers when the board 40 is formed into a cylinder to be received in the drop tube 28. Although the emitter/receiver pairs are shown as defining an upper and lower set of emitter/receiver pairs, the emitters and receivers can all be placed at the same level, such that there is a single row of emitter/receivers.

As noted above, the light beam can be spread (i.e., as a cone). Thus, the receiver in the lower row (with reference to FIGS. 9A-C), could detect the light from the emitters in the upper row. Thus, although the emitters and receivers are formed in two rows, they would operate as a single row of emitters and receivers. However, if the two rows of emitters and receivers are spaced far enough apart, the receivers from the lower row would not detect the light from the emitters in the upper row (and vice versa), and the sensor would thus have in fact two rows of emitter/receiver pairs.

In the illustrative embodiment described so far, the emitter is described is being positioned to be facing generally towards the receiver. However, the light from the emitter can reach the receiver in other ways as well, for example, by a light guide or by reflection. The use of a light guide allows for controlling of the direction of the light produced by the emitter, irrespective of the direction the emitter is facing. Hence, with light guides, the emitter and receiver can be separated even further. For example, the emitter can be positioned in the control housing 32 or the head box 30. Light guides can be used to direct the light transmitted from the emitter into the drop tube, such that the light traverses a length, instead of a width, of the drop tube. In this variation, the receivers will be positioned in the drop tube at a desired level in the drop tube. The receivers could be at or close to the bottom of the drop tube, or they could be near the top of the drop tube, or they could be anywhere along the length of the drop tube. The light guide would be configured such that the light from the emitter would be directed towards the receivers, such that the receivers would sense or detect the light from the emitters. In this example, the emitters and receivers could each be placed on their own circuit board, and the two circuit boards could then be placed in communication with the controller 34.

As is known, the receivers detect the light from the emitters, and produce a first signal as long as the light is detected. When the receiver no longer detects the light from the emitter, a second signal will be produced by the receiver, indicative of the fact that it no longer detects light.

In operation, as feed is eaten by the poultry in the poultry house, the level of feed in the feeder 20, and hence, the level of feed in the drop tube 28, will drop. As long as the feed in the drop tube is above a certain "full" level, the receiver will not sense or detect light from the emitter. However, when the feed in the drop tube 28 falls below a certain "empty" level, the receivers will detect light from the emitters, and the sensor 40 will send a signal to the controller 34 via the control cable 48, indicative of the fact that the feed has fallen below the predetermined "empty" level. This can be considered a "start" signal. At this point, the controller 34 will close the relay 36 to activate the motor EM. Activation of the motor EM will begin driving the conveyor mechanism to deliver feed to the feeders 10 (including the control pan) in the feed line. When the level of feed in the drop tube 28 of the control pan 20C, again raises up to the "full" level, the receiver will effectively be covered by grain and light from the emitter will be blocked. The sensor 40 will thus send the second signal to the controller indicative of the fact that the grain has reached a "full" level within the drop tube. The controller will use this "stop" signal to open the relay to deactivate the motor EM, thereby stopping the delivery of feed to the feeders.

In one variation of the control, when the emitters and receivers are arranged in levels or tiers, as shown in FIG. 9C, the "start" signal can be sent when the feed falls below the level of the lower set of emitters and receivers, and the "stop" signal can be sent when the feed again reaches the level of the upper set of emitters and receivers. In this instance, the lower emitter/receiver pair defines the "empty" level in the control feeder at which point the motor is activated to deliver feed to the feeders 20 and 20C along the feed line FL. Similarly, the upper emitter/receiver pair defines the "full" level which, when reached the motor is deactivated to stop delivery of feed through the feed system. In another alternative, when the sensors and receivers are formed in tiers, as in FIG. 9C, the different tiers or rows of sensors can simply provide redundancy in the control of the feed system.

In another alternative, the emitters can be are arranged to project light axially along a length of the drop tube (rather than across a width of the drop tube. In this alternative, receivers could be set at two or more different heights in the drop tube, with the lower level receivers being at an "empty" level and upper level receivers being at a "full" level. Alternatively, the light emitters could be positioned below the receivers to transmit light upwardly through the drop tube. In this instance, there could be a plurality of light emitters which define at least two rows of emitters; with a lower of the rows defining the "empty" level and the upper of the rows defining the "full" level. In this variation, when receivers begin to receive light from the emitters in the "empty" level row, the start signal will be sent to activate the motor EM; and when the receivers no longer receive light from the emitters in the "full" level row, a stop signal will be sent to deactivate the motor EM.

As noted above, the infrared receivers 46 and the infrared emitters 44 are formed in groups of three. The use of groups of receivers and emitters reduces the potential for the sensor to emit a false signal. Thus, for the system sensor to issue a "start" signal, all three receivers in the lower set of receives must be receiving or sensing the light from the corresponding emitters. Similarly, for the system to issue a "stop" signal, all three receivers in the upper group of receivers must issue a signal that they are not receiving light from their corresponding emitters. Although the emitters and receivers are shown as sets of three, the redundancy (which reduces the probability of false signals) could be provided by using emitters and receives in sets of two, or sets of four or more.

As various changes could be made in the above constructions without departing from the scope of the claimed invention, it is intended that all matter contained in the above description or shown in the accompanying drawings shall be interpreted as illustrative and not in a limiting sense. For example, although the sensor 40 is shown to have two pair of emitters and receivers (defining an upper and lower set of emitters and receivers), the sensor could be produced with a single pair of emitters and receivers or three or more pairs of emitters and receivers. Although the emitters/receivers are disclosed to emit and receive infrared light, light at other wavelengths could also be used by the sensor. Although the sensor 40 is shown as being positioned in the drop tube of the feeder, the sensor could be placed in locations in the feed system that are proximate the drop tube. These examples are merely illustrative.

The invention claimed is:

1. A control feeder for use in a feed system, the control feeder including a feed pan adapted to hold a determined amount of feed and a drop tube which opens into the feed pan; the drop tube being adapted and configured to be placed in communication with a feed delivery tube of the feed system; the control feeder further including a feed level sensor adapted to detect the level of feed within the drop tube; the feed level sensor comprising at least one light emitter and at least one light receiver; at least one of the light emitter and light receiver being positioned within the drop tube, the at least one light receiver being positioned to receive light from the at least one light emitter; the feed level sensor emitting a "start" signal when feed within the drop tube is detected to be at or below be a predetermined "empty" level and a "stop" signal when feed in the drop tube is detected to be at or above a predetermined "full" level.

2. The control feeder of claim 1 wherein the at least one light emitter and light receiver are both positioned in the drop tube, the at least one light emitter being positioned in the drop tube to direct light across a width of the drop tube.

3. The control feeder of claim 2 wherein said at least one receiver and at least one emitter define only a single row, said "empty" level and said "full" level being at the same height relative to the drop tube.

4. The control feeder of claim 2 wherein said at least one receiver and said at least one emitter comprise two or more receivers and emitters; said receivers and emitters defining at least two rows of receiver/emitter pairs.

5. The control feeder of claim 4 wherein said "empty" level is below said "full" level; said at least one sensor and at least one emitter comprising at least a first emitter/receiver pair positioned at said "empty" level in said drop tube and a second emitter/receiver pair positioned at said "full" level in said drop tube.

6. The control feeder of claim 2 wherein said feed level sensor comprises a circuit board which is mounted within the drop tube, said circuit board including said at least one receiver and said at least one emitter.

7. The control feeder of claim 6 wherein said circuit board is flexible.

8. The control feeder of claim 1 wherein said at least one light emitter is positioned and adapted to transmit light axially through a length of said drop tube.

9. The control feeder of claim 8 wherein said at least one light emitter is positioned at or above a top of said drop tube and said at least one receiver is positioned in said drop tube at a level below said emitter.

10. The control feeder of claim 9 including a control box; said light emitter being positioned in said control box; said feeder further including a light guide to direct light from said emitter into said drop tube, such that the light from said emitter is transmitted along a length of said drop tube to be detected by said receiver.

11. The control feeder of claim 9 wherein said at least one receiver comprises at least one receiver positioned at an "empty" level in said drop tube and at least one receiver positioned at a "full" level in said drop tube; said receivers at said full and empty levels all being arranged to detect light transmitted by said emitters.

* * * * *